(12) United States Patent
Yang et al.

(10) Patent No.: US 9,032,489 B2
(45) Date of Patent: May 12, 2015

(54) METHOD AND DEVICE FOR PROXY ACCESS OF OPEN PLATFORM

(71) Applicants: Rongde Yang, Guangdong (CN); Qiyu Tan, Guangdong (CN)

(72) Inventors: Rongde Yang, Guangdong (CN); Qiyu Tan, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 53 days.

(21) Appl. No.: 13/903,771

(22) Filed: May 28, 2013

(65) Prior Publication Data

US 2013/0263232 A1 Oct. 3, 2013

Related U.S. Application Data

(63) Continuation of application No. PCT/CN2012/070491, filed on Jan. 17, 2012.

(30) Foreign Application Priority Data

Jan. 17, 2011 (CN) .......................... 2011 1 0009303

(51) Int. Cl.
| | |
|---|---|
| H04L 29/00 | (2006.01) |
| H04L 29/06 | (2006.01) |
| G06F 9/445 | (2006.01) |
| G06F 21/12 | (2013.01) |
| G06F 9/44 | (2006.01) |
| G06F 21/10 | (2013.01) |
| H04L 12/24 | (2006.01) |
| H04L 29/08 | (2006.01) |

(52) U.S. Cl.
CPC . *H04L 63/08* (2013.01); *G06F 8/20* (2013.01); *G06F 21/10* (2013.01); *G06F 8/60* (2013.01); *G06F 21/126* (2013.01); *G06F 21/128* (2013.01); *H04L 41/5041* (2013.01); *H04L 67/10* (2013.01); *H04L 67/20* (2013.01); *H04L 63/0884* (2013.01); *G06F 8/30* (2013.01)

(58) Field of Classification Search
CPC .......... H04L 41/50; H04L 29/08; H04L 67/10
See application file for complete search history.

(56) References Cited

U.S. PATENT DOCUMENTS

| | | | |
|---|---|---|---|
| 8,090,699 B2 * | 1/2012 | Pousti et al. ................... | 707/705 |
| 2009/0328181 A1 * | 12/2009 | Ye et al. ............................. | 726/9 |
| 2012/0180029 A1 * | 7/2012 | Hill et al. ....................... | 717/135 |

FOREIGN PATENT DOCUMENTS

| | | |
|---|---|---|
| CN | 1555178 A | 12/2004 |
| CN | 1649324 A | 8/2005 |
| CN | 101742007 A | 6/2010 |

OTHER PUBLICATIONS

Andrén, Bo. "Open multimedia platform framework." Ericsson Review 1 (2009): 17-21.*

*Primary Examiner* — Madhuri Herzog
(74) *Attorney, Agent, or Firm* — Kirton McConkie; Evan R. Witt

(57) ABSTRACT

Disclosed are a method and device for a proxy access of an open platform for solving technical problems that resource occupancy is excessive, a password security is low, and a local file cannot be uploaded. In the present invention, an official application is established in a user terminal, and the official application interacts with the open platform by an SDK provided by the open platform; the official platform is bound by applying for a protocol with the URL format from an operating system of the user terminal, and provides an interaction interface for the third party application through the protocol with the URL format. Therefore, the present invention reduces the system resource which the third party application occupies in the user terminal and the development cost of the third party application, and protects the security of the user's account.

3 Claims, 3 Drawing Sheets

METHOD AND DEVICE FOR PROXY ACCESS OF OPEN PLATFORM

CROSS REFERENCE TO RELATED APPLICATION

This application is a continuation of International Application No. PCT/CN2012/070491, filed on Jan. 17, 2012. This application claims the benefit and priority of Chinese Application No. 201110009303.6, filed Jan. 17, 2011. The entire disclosures of each of the above applications are incorporated herein by reference.

BACKGROUND OF THE INVENTION

1. Field of the Invention

The present invention relates to an open platform application field, and more particularly to a method and device for a proxy access of an open platform.

2. Description of Prior Art

In order to support a third party to develop third party application programs for fulfilling various application requirements, an open platform provides an application programming interface (API) for a third party application, and the open platform usually provides a software development kit (SDK) of the API for the third party application to download so that the third party may use the fast and convenient developments. The third party application developed by a developer exchanges data with the open platform by calling the SDK to provide plentiful terminal applications for a user. When the third party application for the open platform which requires an authentication is utilized, the user needs to input a username and a password, so as to call a functional interface of the open platform normally after the open platform has gone through authentication.

For example, microblog systems of some large websites provide particular open platforms, and the open platforms provide the API and SDKs for a third party software developer, and a vast number of microblog messages, relationships of fans, and hot topics occurring anywhere and anytime are provided through the API. An application developer of a mobile terminal can directly read and write the contents provided by the microblog systems through the API or using the SDK, so as to find out new applications of the microblog systems. Taking a client application at a client end using the microblog by a mobile phone for example, a user can share contents of pictorials, pictures or the like on a microblog open platform at anytime after the user inputs the username and password, which have been already pre-registered in the microblog by himself or herself, at the client end. However, a defect in implementing the scheme in this way is that the SDK is required to be embedded in the third party application to process registration and authentication logics. For the third party application which only utilizes a few functions of the open platform, such an implementation may have larger resource occupancy and a higher development cost. Furthermore, the user needs to input the username and password while utilizing the third party application, a security problem that the username and password are embezzled may occur.

The open platform has further a scheme without the registration and authentication in the third party application. In this scheme, the embedded SDK is not required in the third party application. The third party application sends a request of a uniform resource locator (URL) in a specific format to the platform through a browser. The URL includes particular data parameters. If the open platform requires the authentication and registration, then the user needs to input the username and password, which are acquired from the open platform, in a web page returned by the open platform to complete the request. Taking the open platform of Tencent microblog (http://open.t.qq.com/) for example, the third party application may send a request of URL in the specific format as follows to post a microblog item:

http://v.t.qq.com/share/
share.php?title=mytitle&url=myurl&pic=mypic

Amongst, the string "mytitle" is a microblog content to be posted, and the string "myurl" is a link to be added to the content. The string "mypic" is a picture required to be attached. The third party application fills the content to be posted, link, and picture according to a practical situation. If it is under an unregistered state, then the user needs to input the username and password in the page returned by the platform and then posts after confirmation.

A drawback of the above-mentioned second implementation scheme is that since the URL format and the open platform interact and the URL attains a format limitation of the carried parameters, hence a local file cannot be uploaded and the file indicated by the parameters can only come from the internet source. Furthermore, the user is required to input the username and password in the third party application, and thus lead to a security problem that the username and password are embezzled may occur.

SUMMARY OF THE INVENTION

In view of the above, this invention is mainly to provide a method and device for a proxy access of an open platform, which is aimed at resolving technical problems that excessive resource occupancy as well as a low password security since an embedded SDK in a platform of a third party application, a local file cannot be uploaded since an interaction interface of a URL format is limited by formats of parameters, etc.

To achieve the above objectives, the technical scheme of the present invention is implemented as follows.

A method for a proxy access of an open platform is disclosed. The method comprises:

an official application is established in a user terminal, and a third party application accesses the open platform through an interaction interface provided by the official application; the official application implements to interact with the open platform through a software development kit (SDK) provided by the open platform; the interaction interface provided by the official application is an interface which is provided by the official application for the third party application and meets a protocol with a uniform resource locator (URL) format.

Further, a process that the third party application interacts with the open platform through the official application particularly comprises:

the third party application sends a request for accessing the open platform through the protocol with the URL format;

the official application interprets the accessing request sent by the third party application and forwards the request to the open platform through an API after acquiring content of the request; and the open platform sends a result responding to the request to the official application, and the official application further forwards the responding result to the third party application which sends the request.

The official application provides a configuration interface, the official application is instructed to apply for the protocol with the URL format from an operating system of the user terminal through the configuration interface, the protocol with the URL format is bound with the official application, and the third party application wakes up the official application by sending an accessing request under the protocol with the URL format.

The official application further provides a processing function of verification and authentication to a registration made by a user, and acts as a proxy of the open platform for executing a local verification and authentication of an accessing request of the third party application after the registration in the official application is successful.

Further, if the accessing request which the third party application sends to the official application through the protocol with the URL format includes a file address parameter, the official application interprets the request sent by the third party application, and then reads content of a file locally according to the file address parameter and sends the content of the file together with the request to the open platform through the API.

Based on the above-mentioned method, the present invention further discloses a user terminal. The user terminal comprises:

an official application implements to interact with an open platform through an SDK provided by the open platform, and further applies for a protocol with a URL format from an operating system of the user terminal and provides an interaction interface for one or more third party applications through the protocol with the URL format; and the third party application or applications initiate a request to the official application for interacting with the open platform and acquire a responding result.

The official application provides a configuration interface, the official application is instructed to apply for the protocol with the URL format from the operating system of the user terminal through the configuration interface, the protocol with the URL format is bound with the official application, and the third party application wakes up the official application by sending an accessing request under the protocol with the URL format.

The official application further provides a processing function of a verification and authentication to a registration made by a user, and acts as a proxy of the open platform for executing a local verification and authentication of an accessing request of the third party application after the registration in the official application is successful.

If an accessing request which the third party application sends to the official application through the protocol with the URL format includes a file address parameter, the official application interprets the request sent by the third party application, and then reads content of a file locally according to the file address parameter and sends the content of the file together with the request to the open platform through an API.

In the present invention, the official application is established in the user terminal, such that the official application takes charge of the data exchange with the open platform, processes of the authentication to the registration made by the user and provides the application program interface with the URL format for the third party applications in the user terminal. Accordingly, the system resource which the third party applications occupy in the user terminal is reduced, the development cost is reduced, and the security of the user's account is heightened.

DETAILED DESCRIPTION OF THE INVENTION

A basic concept of the present invention includes: an official application is established in a user terminal, an SDK is embedded in the official application, and the official application exchanges data with an open platform through an API in the SDK and is in charge of authentication to a registration made by a user for the open platform; the official application provides an application program interface with a URL format which is simple and user-friendly for the user terminal; a third party application interacts with the official application based on the application program interface with the URL format made public by the official application, and the official application is capable of connecting to multiple third party applications. The official application acts as an intermediate layer between the open platform and the third party applications, such that the multiple third party applications can share one SDK to implement single sign-on of a username and account, thereby saving resource occupancy in the user terminal, reducing development cost, and protecting security of the account.

To clarify objectives, technical solutions and advantages of the present invention, the present invention will be further described in detail as follow by giving embodiments with reference to the accompanying drawings.

Figure 1:
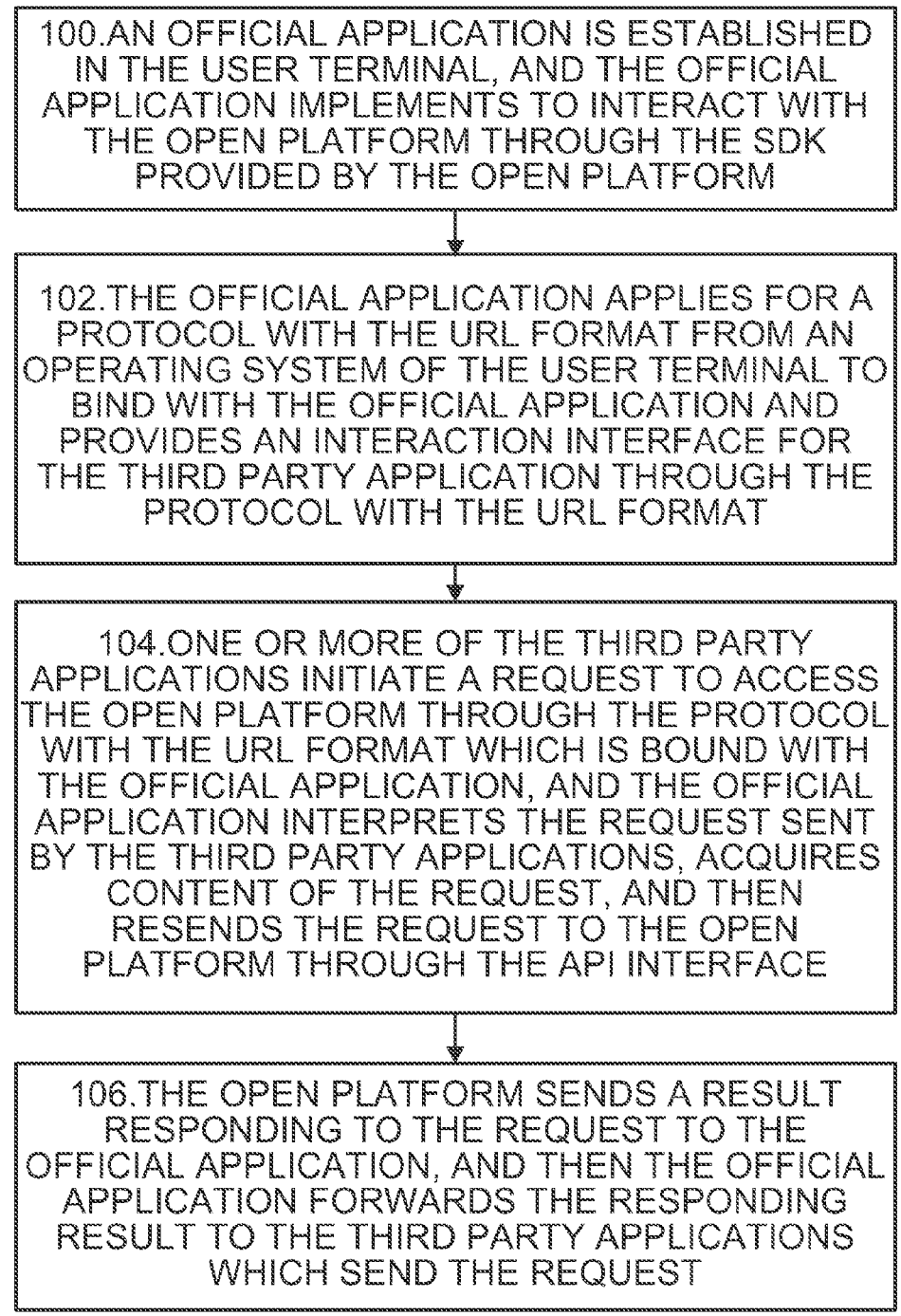
FIG. 1 is a flowchart showing steps of a method for a proxy access of an open platform of the present invention.

FIG. 1 is a flowchart showing steps of a method for a proxy access of an open platform of the present invention, which particularly comprises the following steps.

In step 100, an official application is established in a user terminal, and the official application implements to interact with an open platform through an API provided by the open platform.

The open platform releases the application program interface (API) in public for external applications to call services provided by the open platform. The open platform usually packages functions of the API to form the software development kit (SDK) and releases to third parties. The third party applications directly communicate with a server of the open platform to exchange data. Each third party application requires the SDK embedded therein and requires repeatedly processes permission control including verification to a registration made by a user, and so on. In the present invention, the official application utilizes programs of the SDK provided by the open platform to implement the data exchange with the open platform. The SDK is embedded in the official application to implement an interface proxy of the open platform, thereby avoiding that the SDK is required to be embedded in each third party application and decreasing resource occupancy in the user terminal.

Preferably, an interface is provided in the official application for the user to register with the open platform, and the official application provides a function of inputting the account and password. When the third party applications access the open platform through the official application, the registration and authentication of the user are completed automatically or according to the authorization of the user. After the registration is successful, the account and password are encrypted and stored. Multiple third party applications can share the official application to register with the open platform. The single sign-on can be implemented through the official application, thereby protecting the security of the account in the greatest possible way.

In step 102, the official application applies for a protocol with the URL format from an operating system of the user terminal to bind with the official application and provides an interaction interface for the third party application through the protocol with the URL format.

A standard Internet access protocol utilizes a uniform resource locator (URL) to access Internet resources, for instance, Hyper Text Transfer Protocol (HTTP), Hyper Text Transfer Protocol Secure (HTTPS), Microsoft Media Server protocol (MMS), and the like, having URL prefixes such as http://, https://, mms://, and the like. The official application of the present invention may be bounded by applying for the protocol with the specific URL format. For instance, the official application may be bound by applying for the protocol with the URL format in a form of txwb:// from the system. Any third party application may evoke the official application by sending a URL access in the form of txwb://, thereby simplifying the development of the third party applications.

In step 104, one or more of the third party applications initiate a request to access the open platform through the protocol with the URL format which is bound with the official application. The official application interprets the request sent by the third party application, acquires content of the request, and then resends the request to the open platform through the API.

After the official application applies for the protocol with the URL format from the operating system of the user terminal, the third application can call the official application. For instance, a microblog is posted by the following URL address:

txwb://
share?content?=mycontent&pic=\var\local\pic.png

The official application receives the request of the third party application, interprets the access request of URL sent by the third application, and acquires parameters in the URL. The string "txwb://" is a head part of an address in the protocol with the URL format to bind with the official application. The string "share" is an identifier assigned to a microblog application. The string "content" is a parameter which is utilized to indicate text content of the microblog. The string "pic" is a parameter which is utilized to indicate a picture of the microblog. Certainly, the access request of URL may be extended according to specific applications. For instance, corresponding parameters are increased, and the parameters are separated by a parameter delimiter "&".

In step 106, the open platform sends a result responding to the request to the official application, and then the official application forwards the responding result to the third party application which sends the request.

The technical scheme of the present invention will be described in the following example with respect to a microblog system.

In a traditional mode, a service end system of a microblog is served as an application program interface (API) which the open platform opens for the third party application, forms functions of the API as a software development kit (SDK), and distributes the SDK to the third party application. In the present invention, a manufacturer constructing the microblog system, that is, an official party, releases an official application. The official application is implemented based on programs of the SDK released by the official party. The constructing manufacturer of the microblog system releases the official application to a manufacture of mobile terminals. The official application is embedded in an operating system of the mobile terminal by the manufacturer of the mobile terminals or is downloaded and installed in the mobile terminal by a mobile terminal user after the official application is released on the network.

The official application is served as a proxy of the third party application to access the service end of the microblog to implement interactions between one or more third party applications and the service system of the microblog. The official application provides a configuration interface. The official application may be notified to apply for the protocol with the specific URL format from the operating system through the configuration interface, and the official application is bound with the protocol with the specific URL format. For instance, the protocol with the URL format in which the string "txwb://" is a head part of an access address may be applied through the configuration interface to be served as an application program interaction interface between the third party application and the official application. When the third party application initiates an interaction request to the open platform through the access format of the URL address with the head string "txwb://", the official application is woken up automatically.

Figure 2:
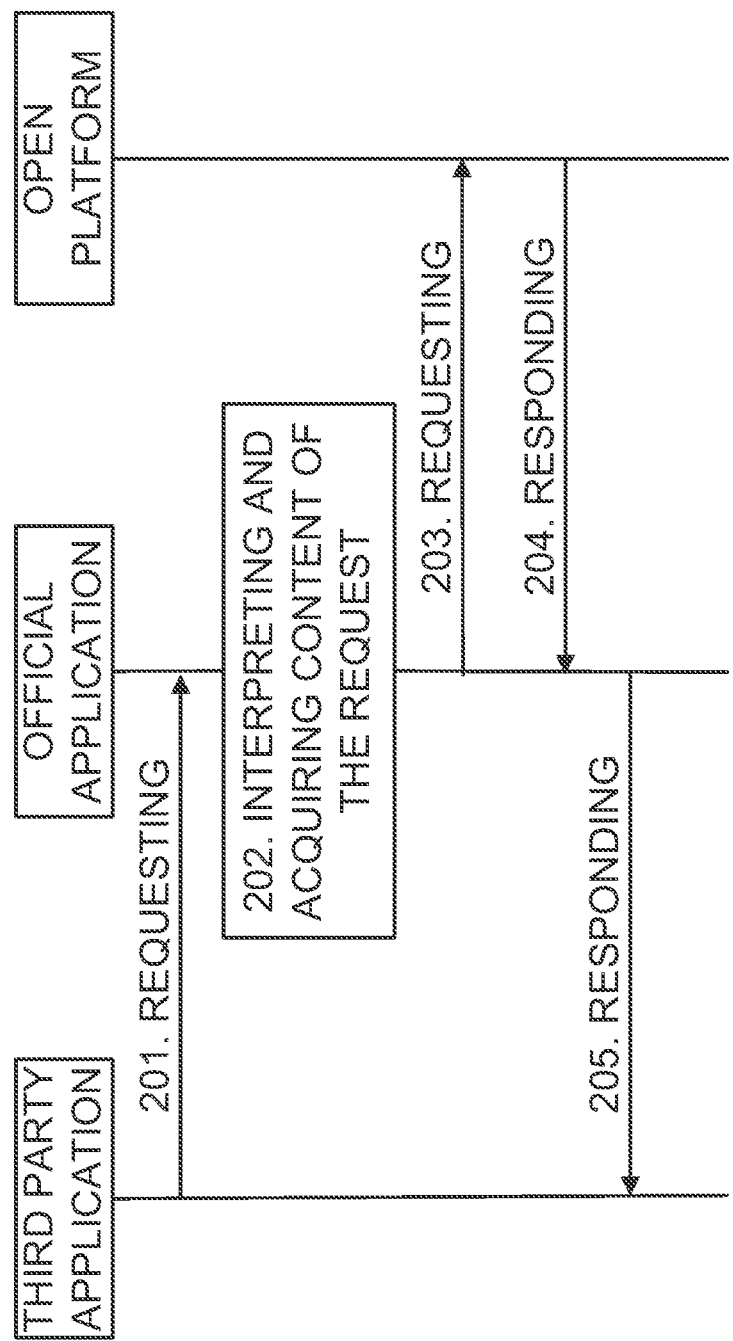
FIG. 2 shows a process of interacting information among a third party application, an official application, and an open platform in accordance with the present invention.

Taking a microblog application which is shown in FIG. 2 for example, the interaction process between the third party application and the open platform comprises the following steps.

In step 201, the third party application initiates a request which meets the protocol with the specific URL format to the official application to additionally add a microblog.

For instance, the request is initiated to the official application through the URL address "txwb://share?content=mycontent&pic=\var\local\pic.png" to request to post a microblog in the microblog system. The string "mycontent" is content of the microblog to be posted. The string "\var\local\pic.png" is a picture corresponding to the microblog. The picture is a picture which is stored locally. The third party application does not require sending practical content of the picture to the official application. Since the picture is stored locally, the official application may directly read the picture according to a path.

In step 202, the official application receives the request, interprets the access request with the URL format, and acquires content of the request.

The official application acquires the request content in the request. If the request content includes a media file (such as file types of picture, motion animation, video, audio, etc.), the official application reads content of the media file according to an address of the media file indicated by the URL.

In step 203, the official application converts the request which is sent through the protocol with the specific URL format to an access request in an API form and forwards the access request to the open platform.

For additionally adding the microblog, the official application forwards the request for additionally adding the microblog to the open platform through the API of the open platform and uploads the content of the microblog together with the read content of the media file to the open platform in the form of the API.

In step 204, the open platform receives the request in the API form sent by the official application, then executes a corresponding process and feeds a result of the process back to the official application.

In step 205, the official application further feeds the result of the process back to the third party application. The step is an optional step.

Preferably, in order to increase security of information such as the user's account and password, the official application may further provide a processing function of verification and authentication to a registration made by a user. In a situation that the function is not provided, each third party application requires processing the verification and authentication per se to the registration made by the user. After the function is provided, the user only requires inputting the account and password through an account/password input interface provided by the official application, thereby interacting with the open platform for implementing the verification and authentication to the registration made by the user. After the registration in the official application is successful, the official application may act as a proxy of the open platform for executing the verification and authentication to the registration of the third party application. By the method, times of the verification to the registration between the user terminal and the service end are decreased, single sign-on is implemented, security of the account and password is heightened, and the account and password are managed conveniently.

Figure 3:
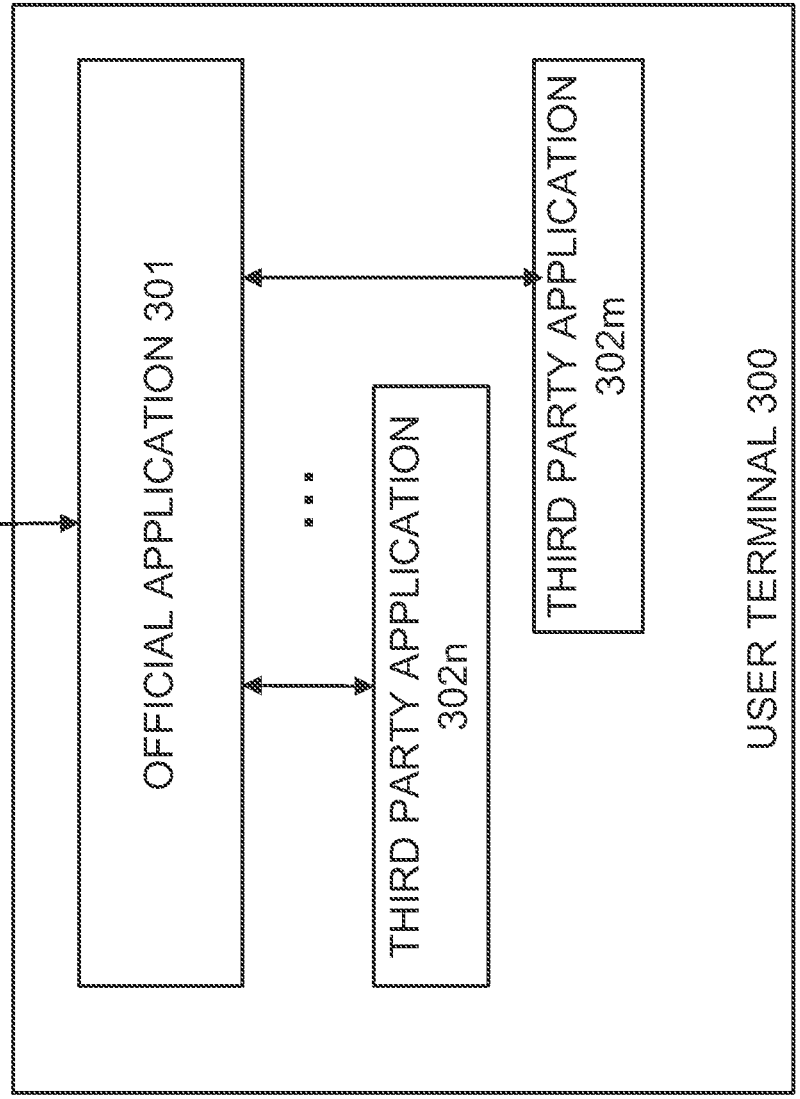
FIG. 3 shows a user terminal which implements the method of the present invention in accordance with the present invention.

FIG. 3 shows a user terminal 300 which implements the method of the present invention based on the above-mentioned method of the present invention. The terminal comprises an official application 301 and one or more third party applications 302.

The official application 301 is utilized to implement to interact with an open platform through an SDK provided by the open platform, and further utilized to apply for a protocol with a URL format from an operating system of the user terminal and provides an interaction interface for the one or more third party applications through the protocol with the URL format.

Preferably, the official application 301 provides a configuration interface. The official application 301 may be instructed to apply for the protocol with the URL format from the operating system of the user terminal through the configuration interface, and the protocol with the URL format is bound with the official application 301. The third party application 302 wakes up the official application 301 by sending an access request having the protocol with the URL format.

Preferably, the official application 301 further provides a processing function of verification and authentication to a registration made by a user, and acts as a proxy of the open platform to implement a local verification and authentication to the accessing request of the third party application 302 after the registration in the official application 301 is successful.

The third party application 302 is utilized to initiate a request to the official application 301 to interact with the open platform and acquire a responding result.

If an access request which the third party application 302 sends to the official application 301 through the protocol with the URL format includes a file address parameter, the official application 301 interprets the request sent by the third party application 302, and then reads content of a file locally according to the file address parameter, and sends the content of the file together with the request to the open platform at the service end through an API.

Since the user terminal 300 provided by the present invention is utilized to implement the method for the proxy access of the open platform provided by the present invention, functional modules included in the user terminal 300 are disposed to implement the steps and flows of the method of present invention. To save space, contents in the embodiment of the apparatus the same as those in the embodiment of the method and contents which may be deduced without doubt are omitted herein. This should not be understood as limits to the embodiment of the apparatus of the present invention. Any system, apparatus, and module to implement the method of the present invention should be included in the protection scope of the present invention.

The above-mentioned descriptions are preferred embodiments of the invention rather than being used for limiting the protection scope of the present invention.

INDUSTRIAL APPLICABILITY

In the present invention, the official application is established in the user terminal, such that the official application takes charge of the data exchange with the open platform, processes of the authentication to the registration made by the user and provides the application program interface with the URL format for the third party applications in the user terminal. Accordingly, the system resource which the third party applications occupy in the user terminal is reduced, the development cost is reduced, and the security of the account is heightened.

What is claimed is:

1. A method for a proxy access of an open platform, the method comprising:

establishing an official application in a user terminal, and a third party application accessing the open platform through an interaction interface provided by the official application, wherein the official application implements to interact with the open platform through a software development kit (SDK) provided by the open platform; the interaction interface provided by the official application is an interface which is provided by the official application for the third party application and meets a protocol with a uniform resource locator (URL) format, wherein a process that the third party application interacts with the open platform through the official application particularly comprises:

the third party application sending a request for accessing the open platform through the protocol with the URL format;

the official application interpreting the accessing request sent by the third party application, and forwarding the request to the open platform through an API after acquiring content of the request, the official application directly reading the content of the request which is stored in the user terminal; and the open platform sending a result responding to the request to the official application, and the official application further forwarding the responding result to the third party application which sends the request.

2. The method according to claim 1, wherein if the accessing request which the third party application sends to the official application through the protocol with the URL format includes a file address parameter, the official application interprets the request sent by the third party application, and then reads content of a file locally according to the file address parameter and sends the content of the file together with the request to the open platform through the API interface.

3. A method for a proxy access of an open platform, the method comprising:

establishing an official application in a user terminal, and a third party application accessing the open platform through an interaction interface provided by the official application, wherein the official application implements to interact with the open platform through a software development kit (SDK) provided by the open platform; the interaction interface provided by the official application is an interface which is provided by the official application for the third party application and meets a protocol with a uniform resource locator (URL) format,
wherein the official application provides a configuration interface, the official application is instructed to apply for the protocol with the URL format from an operating system of the user terminal through the configuration interface, the protocol with the URL format is bound with the official application, and the third party application wakes up the official application by sending an accessing request under the protocol with the URL format.

* * * * *